(12) United States Patent
Kirk

(10) Patent No.: US 11,296,575 B1
(45) Date of Patent: Apr. 5, 2022

(54) ELECTRIC MACHINE WITH SINGLE LAYER AND MULTILAYER COMMUTATOR BRUSHES

(71) Applicant: BorgWarner Inc., Auburn Hills, MI (US)

(72) Inventor: Michael E. Kirk, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/123,505

(22) Filed: Dec. 16, 2020

(51) Int. Cl.
*H02K 5/14* (2006.01)
*H01R 39/38* (2006.01)

(52) U.S. Cl.
CPC ........... *H02K 5/146* (2013.01); *H01R 39/388* (2013.01)

(58) Field of Classification Search
CPC ........ H01R 39/20; H01R 39/22; H01R 39/24; H01R 39/26; H01R 39/27; H01R 39/36; H01R 43/12; H01R 39/38; H01R 39/385; H01R 39/386; H01R 39/388; H01R 39/39; H02K 5/14; H02K 5/143; H02K 5/145; H02K 5/146; H02K 5/148
USPC ................................................. 310/239–253
See application file for complete search history.

(56) References Cited

U.S. PATENT DOCUMENTS

| | | | |
|---|---|---|---|
| 6,815,862 B2 | 11/2004 | Inukai et al. | |
| 7,466,056 B2 | 12/2008 | Golab et al. | |
| 8,368,281 B2 | 2/2013 | Hoell et al. | |
| 9,435,312 B2 | 9/2016 | Neet | |
| 9,444,306 B2 | 9/2016 | Bradfield | |
| 2004/0056537 A1* | 3/2004 | Du | H02K 3/50 310/43 |
| 2006/0226730 A1 | 10/2006 | Fulton | |
| 2010/0141082 A1 | 6/2010 | Harris et al. | |
| 2011/0018386 A1* | 1/2011 | Hoell | H01R 39/24 310/251 |
| 2014/0239767 A1 | 8/2014 | Schuster et al. | |
| 2019/0013719 A1* | 1/2019 | Kihira | H02K 13/006 |

FOREIGN PATENT DOCUMENTS

JP 2008099438 * 4/2008

OTHER PUBLICATIONS

Tip of the Week, PdMA Corporation, Feb. 23, 2015, 1 page.
Sliprings and carbon brushes on turbo-alternators, Morgan Advanced Materials plc, Apr. 2014, 20 pages.

* cited by examiner

*Primary Examiner* — Ahmed Elnakib
(74) *Attorney, Agent, or Firm* — Bose McKinney & Evans LLP

(57) ABSTRACT

An electric machine having a field coil and a rotatable armature coil. A rotatable commutator is conductively coupled with the armature coil and has a plurality of contacts. A plurality of brushes are conductively engageable with the plurality of contacts wherein rotation of commutator about the rotational axis causes the plurality of contacts to sequentially engage the plurality of brushes as the plurality of contacts rotate about the rotational axis. The plurality of brushes includes at least one positive brush and at least one negative brush, the at least one positive brush being a multi-layer brush and the negative brush being a single layer block brush. The multi-layer brush may include a high-copper layer and a low-copper layer with the low-copper layer forming the trailing edge of the brush. The single layer brush may have a copper content greater than the high-copper layer of the multi-layer brush.

9 Claims, 4 Drawing Sheets

ELECTRIC MACHINE WITH SINGLE LAYER AND MULTILAYER COMMUTATOR BRUSHES

BACKGROUND

The present invention relates to electric machines having a commutator and brushes.

Starter motors for vehicles often employ an electric machine having armature coils mounted on a rotor core that rotate relative to stationary field coils. A commutator having a plurality of contacts is conductively coupled with the armature coils and rotates with the rotor. Stationary brushes engage the commutator and conduct electrical current to the armature coils via the contacts. The brushes are coupled with one or more batteries that provide a direct current power source. As the commutator rotates, the brushes sequentially engage the contacts whereby the electrical current in the armature coils is periodically reversed as the commutator and coils rotate about a central axis.

In such vehicle starter motors, it is common for the positive brushes to wear more quickly than the negative brushes. For electric machines operating as a motor, the positive brushes are disposed between the positive terminal of the power source and the armature coils and the negative brushes are disposed between the negative terminal of the power source and the armature coils.

A variety of different brushes are known in the art. The simplest type of brush is formed out of a single block of a homogeneous mix of materials which are primarily carbon and copper and electric machines that have all of their brushes formed out of such single block brushes are known in the art. Electric machines which have all of their brushes formed by dual-layer brushes are also known. The two layers of such dual layer brushes each have a different composition with one layer generally having a higher copper content than the other layer.

While the known electric machines are generally adequate for their purposes, an improved electric machine which utilizes a commutator and brushes is desirable.

SUMMARY

The present invention provides an improved electric machine having a commutator and brushes which takes advantage of the relative strengths of both a multi-layer brush and a single layer block brush.

The invention comprises, in one form thereof, an electric machine that includes at least one field coil; at least one armature coil rotatable relative to the field coil about a rotational axis; a commutator conductively coupled with the at least one armature coil, the commutator having a plurality of contacts wherein the commutator and the plurality of contacts rotate about the rotational axis with the armature coil; a plurality of brushes conductively engageable with the plurality of contacts wherein rotation of commutator about the rotational axis causes the plurality of contacts to sequentially engage the plurality of brushes as the plurality of contacts rotate about the rotational axis with the commutator; and wherein the plurality of brushes includes at least one positive brush and at least one negative brush, the at least one positive brush being a multi-layer brush and the negative brush being a single layer block brush.

In some embodiments, the plurality of brushes includes at least four brushes wherein the plurality of brushes includes an equal number of positive and negative brushes with each of the positive brushes being a multi-layer brush and each of the negative brushes being a single layer block brush.

In the embodiments described above, the multi-layer brush may include a high-copper layer and a low-copper layer wherein both the high-copper layer and the low-copper layer comprise both carbon and copper with the high-copper layer having a greater content (by weight percentage) of copper than the low-copper layer and the low-copper layer has a greater content (by weight percentage) of carbon. In such embodiments, the high-copper layer may have a greater circumferentially extending length than the low-copper layer with the high-copper layer forming the leading edge and the low-copper layer forming the trailing edge of each of the positive brushes. In such embodiments, the multi-layer brushes may have only two layers. The single layer block brushes may also comprise carbon and copper wherein the difference in carbon content between the single layer brush and the high-copper layer is less than the difference in carbon content between the single layer brush and the low-copper layer and wherein the difference in copper content (by weight percentage) between the single layer brush and the high-copper layer is less than the difference in copper content (by weight percentage) between the single layer brush and the low-copper layer. In such embodiments, the single layer brush may have a copper content (by weight percentage) that is greater than the copper content (by weight percentage) of the high-copper layer and wherein the carbon content (by weight percentage) of the single layer brush is less than the carbon content (by weight percentage) of the high-copper layer.

In the embodiments described above, the plurality of brushes may include at least four brushes wherein the plurality of brushes includes an equal number of positive and negative brushes with each of the positive brushes being a multi-layer brush and each of the negative brushes being a single layer block brush.

In the embodiments described above, the electric machine may take form of a starter motor for a vehicle. For example, it may be a starter motor for a commercial vehicle having a 12, 24 or 48 volt electrical system for powering the starter motor.

In the embodiments described above, the electric machine may take the form of a direct current (DC) motor.

In the embodiments described above, the plurality of contacts on the commutator may be formed out of copper.

In the embodiments described above, the circumferentially extending length of the positive brushes may be the same as that of the negative brushes.

In some embodiments, the electric machine has exactly two negative brushes and two positive brushes.

BRIEF DESCRIPTION OF THE DRAWINGS

The above mentioned and other features of this invention, and the manner of attaining them, will become more apparent and the invention itself will be better understood by reference to the following description of an embodiments of the invention taken in conjunction with the accompanying drawings, wherein.

Figure 1:
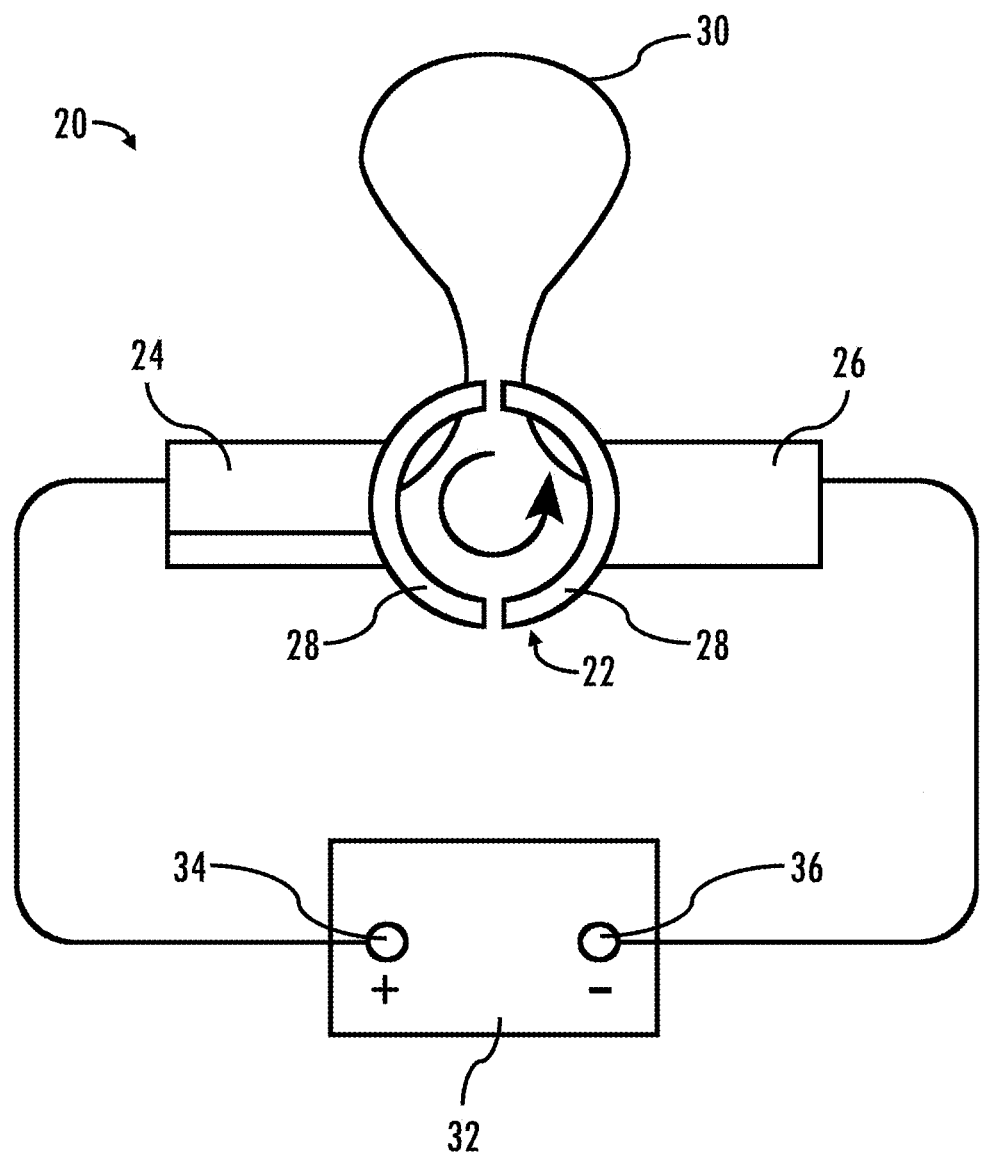
FIG. 1 is a partial schematic view of an electric machine having a commutator and brushes.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

A simplified schematic view of an electrical machine 20 having a commutator 22 and brushes 24, 26 is shown in FIG. 1. Electrical machine 20 shown in FIG. 1 has a relatively simple design wherein there are only two brushes 24, 26 and commutator 22 has only two contacts 28 which engage the brushes 24, 26. The contacts 28 are conductively coupled with armature coil 30 and are located on opposite ends of armature coil 30. The armature coil 30 is mounted on a rotor core which is also attached to commutator 22 and a rotor shaft to thereby form a rotor assembly. Brushes 24, 26 are connected to a direct current (DC) power source 32 such as a battery or battery pack. Brush 24 is a positive polarity brush and is located between the positive terminal 34 of battery 32 and commutator 22. Brush 26 is a negative polarity brush and is located between the negative terminal 36 of battery 32 and commutator 22.

If electric machine 20 was a DC generator instead of a DC motor and was operable to charge battery 32, brush 26 would be the positive brush and brush 24 would be the negative brush. In the embodiments illustrated herein, the electric machines are adapted to be operated only as a DC motor.

As the rotor assembly rotates, the two contacts 28 rotate past the brushes 24, 26. As the contacts 28 exchange position and the engage the opposite polarity brush, the current flow in armature coil 30 is reversed. The rotor assembly rotates relative to field coils (not shown in FIG. 1) which are also energized and the interaction of the electromagnetic fields of the field coils and the armature coils forcibly rotates the rotor assembly when the electric machine is operated as a motor. This type of electric machine can also be operated as a generator by energizing the field coils while supplying a torque to rotate the rotor assembly to thereby generate AC (alternating current) current flow in the armature coils which is output as DC current through commutator 22 and brushes 24, 26. This basic operation of a DC motor and/or a DC generator having a commutator and brushes is well-known to those having ordinary skill in the art.

Figure 2:
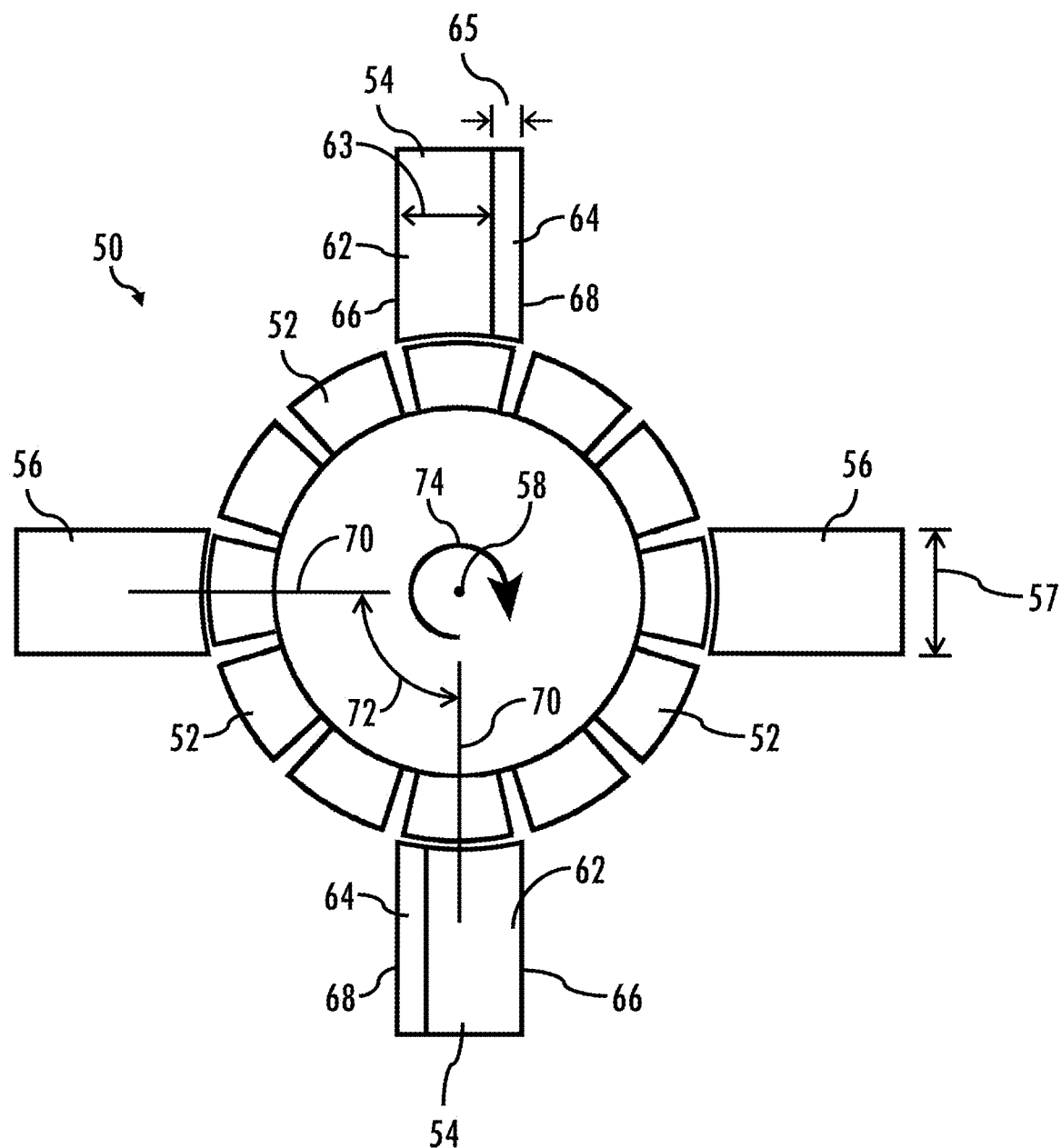
FIG. 2 is a schematic end view of a commutator and brushes.
Figure 3:
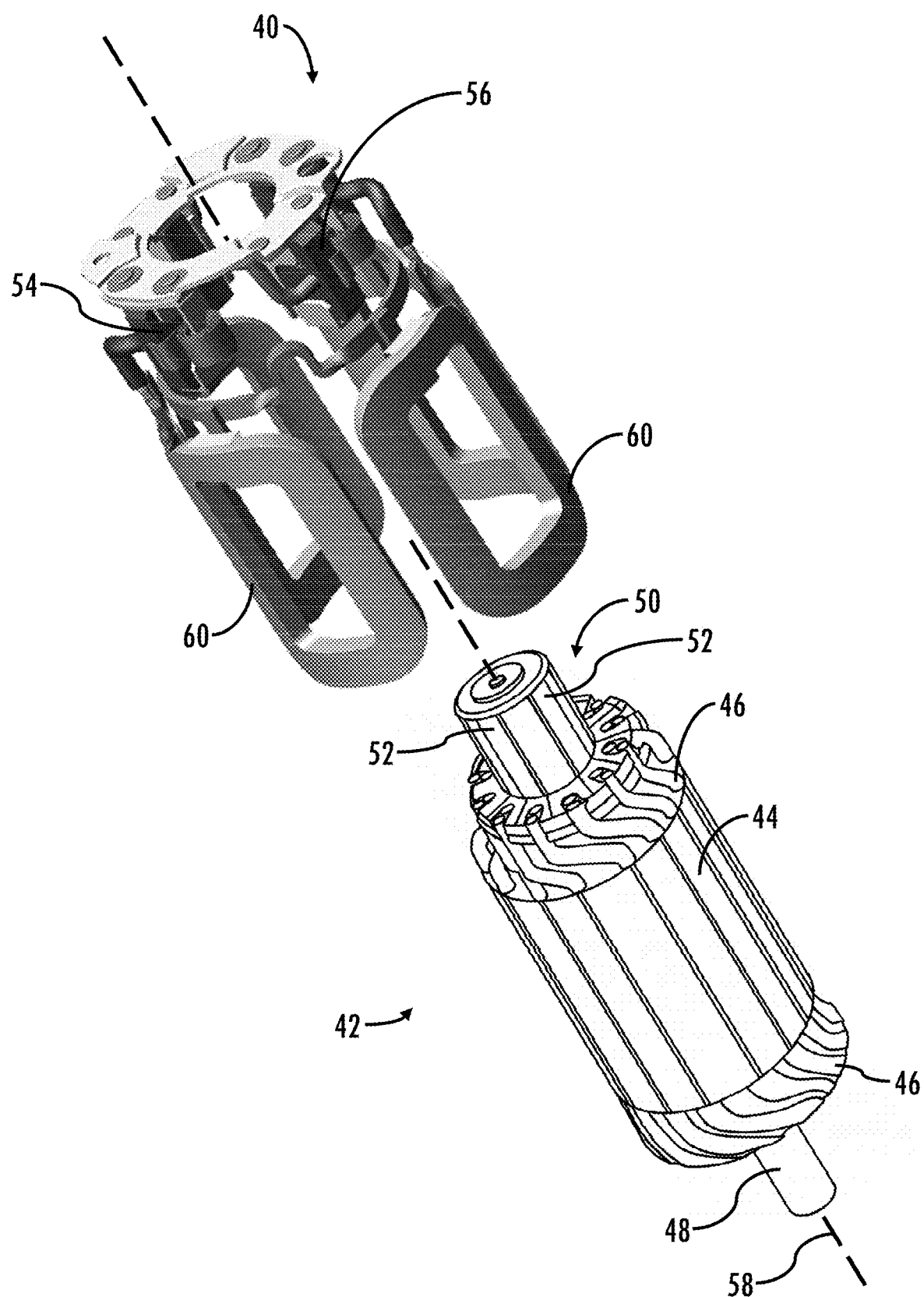
FIG. 3 is an exploded partial perspective view of an electric machine having a commutator and brushes.

FIGS. 2 and 3 illustrate a DC motor that can be used as a starter motor for a vehicle and is particularly well adapted for use as a starter motor for a commercial vehicle. Commercial vehicles such as semi-tractors, buses and other similar large vehicles, may have a battery pack that employs several batteries connected in series to generate a higher voltage than that found in most passenger vehicles. For example, commercial vehicles may have a 12, 24 or 48 volt electrical system while nearly all passenger vehicles have a 12 volt system. U.S. Pat. No. 9,444,306 B2, which is hereby incorporated herein by reference, discloses a method of operating a starter motor that can be utilized with the present disclosure.

In the embodiment of FIGS. 2 and 3, the rotor assembly 42 includes a rotor core 44 formed out of a stack of sheet steel laminations. Rotor core 42 has a plurality of axially extending slots which receive wires forming the armature coils 46. Rotor core 44 is mounted on a rotor shaft 48 and a commutator 50 is disposed at one end of the rotor core 44. Commutator 50 is formed out of a non-conductive material that is attached to rotor core 44 and has a plurality of contacts 52 mounted thereon. The contacts are formed out of an electrically conductive material whereby electrical current can be conveyed between brushes 24, 26 and any contacts 52 engaged therewith. In the illustrated embodiment, contacts 52 are copper. Contacts 52 are circumferentially distributed about commutator 50 and are circumferentially spaced apart and electrically isolated from each other. U.S. Pub. No. 2014/0239767 A1, the disclosure of which is hereby incorporate herein by reference, discloses a commutator and a method of manufacture suitable for use with commutator 50. As can be seen in FIG. 3, DC starter motor 40 includes a plurality of field coils 60 that, when energized, interact with armature coils 46 to generate a torque. The torque is output via rotor shaft 48.

The contacts 52 of commutator 50 are each conductively coupled with one end of an armature coil 46. As commutator 50 and contacts 52 rotate about the rotational axis 58 of electric machine 40, the individual contacts 52 sequentially engage brushes 54, 56. In the illustrated embodiment of FIGS. 2 and 3, DC starter motor 40 includes a total of four commutator brushes 54, 56 with there being an equal number of positive brushes and negative brushes with each of the positive brushes 54 being a multi-layer brush and each of the negative brushes 56 being a single layer block brush.

The brushes are disposed in brush holders that bias the brushes into conductive engagement with contacts 52. As can be seen in FIG. 2, brushes 54, 56 are positioned to extend parallel with a radial line 72 extending from rotational 58. Alternative embodiments, however, might position the brushes at an angle to such a radial line. Examples of brush holders that may be used with the present disclosure can be found in U.S. Pub. No. 2006/0226730 A1; U.S. Pat. No. 7,466,056 B2; and U.S. Pub. No. 2010/0141082 A1 the disclosures of all of which are hereby incorporated herein by reference.

In the embodiment of FIGS. 2 and 3, the radial lines 70 bisecting circumferentially adjacent brushes are positioned at a 90 degree angle in a plane oriented perpendicular to rotational axis 58. This angle is identified by reference number 72 in FIG. 2. The brushes alternate between positive brushes 54 and negative brushes 56 in a circumferential direction.

Each of the contacts 52 are conductively coupled with one end of an armature coil 46. Such coils may take the form of a single wire or a plurality of parallel extending strands. In the simplified illustration of FIG. 2, one end of an individual armature coil 46 is attached to a single contact with the other end being attached to a single contact wherein the two contacts at the ends of an individual armature coil are separated by a rotational angle of 90 degrees the same as the separation between adjacent brushes. Thus, armature coil will be conductively coupled to positive brush 54 at one end and a negative brush 56 at the other end when the contacts of that particular armature coil are conductively coupled with brushes.

In the illustrated embodiments, the positive brushes are all multi-layer brushes while the negative brushes are all single layer block brushes. As used herein, single layer block brushes are brushes having a composition wherein the various constituents comprising that composition form a homogenous mixture throughout the entire body of the brush. In contrast, the multi-layer brushes all have at least two different layers wherein the two layers have different compositions.

While the illustrated embodiments have positive brushes which are dual layer brushes having only two layers, alternative embodiments could employ multi-layer brushes with additional layers. The illustrated dual layer brushes 54 have a high-copper layer 62 and a low-copper layer 64. Both the high-copper layer 62 and low-copper layer 64 are made of materials that include both carbon and copper with the high-copper layer 62 having a greater content (by weight percentage) of copper than the low-copper layer and the low-copper layer having a greater content (by weight percentage) of carbon.

An example of a suitable dual layer brush 54 that can be used for each of the brushes 54 in a starter motor 40 has a high-copper layer that is 48% copper (by weight percentage) and 52% carbon and other additives (by weight percentage). The other additives mixed with the carbon may be in the range of 5% to 15% (by weight percent) resulting in a carbon component of 47% to 37% (by weight percentage) for the high-copper layer. In this exemplary brush, the low-copper layer is 30% copper (by weight percentage) and 70% carbon and other additives (by weight percentage). The other additives mixed with the carbon may be in the range of 5% to 15% (by weight percent) resulting in a carbon component of 65% to 55% (by weight percentage) for the low-copper layer. In this first exemplary dual layer brush 54, the high-copper layer has a specific resistance of 40-140 $\mu\Omega$/cm (micro-ohms per centimeter) while the low-copper layer has a specific resistance with an allowable maximum of 900 $\mu\Omega$/cm (micro-ohms per centimeter).

As most easily seen in FIG. 2, the high-copper layer 62 has a greater circumferentially extending length 63 than the circumferentially extending length 65 of the low-copper layer 64. In FIG. 2, arrow 74 indicates direction of rotation about axis 58 when motor 40 is operating and high-copper layer 62 forms the leading edge 66 and low-copper layer 64 forms the trailing edge 68 of each of the positive brushes 54.

Each of the single layer block brushes 56 is formed out of a material including both carbon and copper wherein the difference in carbon content (by weight percentage) between the single layer brush 56 and the high-copper layer 62 of the dual-layer brush 54 is less than the difference in carbon content (by weight percentage) between the single layer brush 56 and the low-copper layer 64 of the dual layer brush 54 and wherein the difference in copper content (by weight percentage) between the single layer brush 56 and the high-copper layer 62 of the dual layer brush 54 is also less than the difference in copper content (by weight percentage) between the single layer brush 54 and the low-copper layer 64 of the dual layer brush 54. Such relative differences may result from a high-copper layer 62 having a greater copper content (by weight percentage) than the single layer brush 56, however, it will generally be more advantageous for the single layer brush 56 to have a higher copper content (by weight percentage) than the high-copper layer 62 of the dual layer brush 54.

In the illustrated embodiment, single layer brush 56 has a copper content (by weight percentage) that is greater than the copper content (by weight percentage) of the high-copper layer and wherein the carbon content (by weight percentage) of the single layer brush is less than the carbon content (by weight percentage) of the high-copper layer.

More specifically, the illustrated single layer brush 56 has a copper content of 60% (by weight percentage) and a carbon content of 30.8% (by weight percentage). The remaining balance of materials includes 2.8% lubricant, 1.4% zinc and 5% other additives (all by weight percentage). This single layer brush has a resistivity of 10-40 $\mu\Omega$/cm (micro-ohms per centimeter).

Alternative embodiments of starter motor 40 may employ brushes with slightly different compositions. For example, an alternative single layer brush suitable for use with starter motor 40 has a copper content of 65% (by weight percentage) and a carbon content of 26.3% (by weight percentage). The remaining balance of materials includes 2.4% lubricant, 1.3% zinc and 5% other additives (all by weight percentage). This alternative single layer brush has a resistivity of 10-30 $\mu\Omega$/cm (micro-ohms per centimeter).

In the illustrated embodiment, brushes 56 have a circumferentially extending length 57 equal to the total circumferentially extending length of brushes 54, i.e., the sum of circumferentially extending lengths 63, 65 of the high-copper and low-copper layers 62, 64. By using dual layer brushes 54 having the same initial shapes and dimensions as the single layer brushes 56, a common design can be used for all of the brush holders. Alternatively, it would be possible to have negative and positive brushes, and corresponding brush holders, with different initial dimensions and/or shapes whereby the positive brushes 54 would only fit into the positive brush holders and the negative brushes would only fit into the negative brush holders. (It is noted that the initial dimensions will change due to wear over the course of life of the brushes.)

Figure 4:
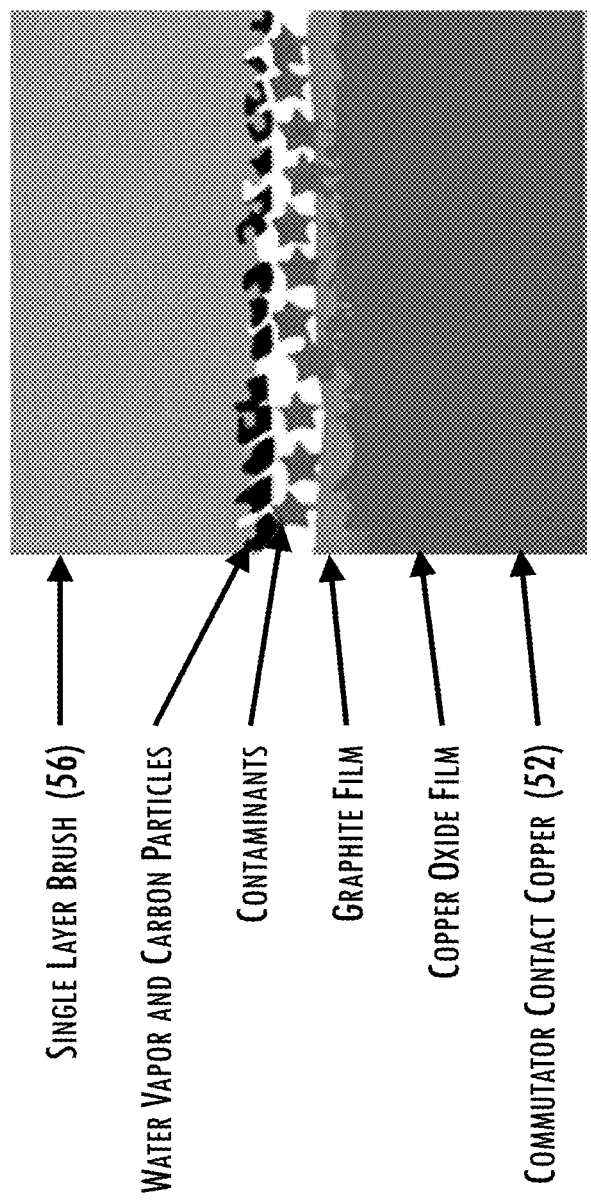
FIG. 4 is a schematic view of the interface between a commutator and a brush.

The wear of the brushes is represented in FIG. 4 which schematically depicts the interface between a single layer brush 56 and a contact 52. A similar process occurs with multi-layer brushes 54. During operation of motor 40, carbon particles are broken off from the brush and combine with water vapor and other contaminants in the interface between the brush and the commutator contact. A patina develops on the surface of the commutator contact, this patina includes a copper oxide film caused by the oxidation of the copper material used to form the contact and a graphite film which results from the loose carbon particles. This patina provides a relatively smooth surface and, once it reaches a sufficient thickness, reduces the mechanical friction between the brush and the commutator contact. Both sets of brushes, i.e., single layer brushes 56 and multi-layer brushes 54, traverse the same area of the contacts 52 and, thus, the resulting film is a product of and acts on both the multi-layer brushes 54 and the single layer brushes 56. The development of this patina is affected by brush chemistry, operating conditions and the environment. An optimal layer of this patina provides for stable performance and a reduced brush wear rate. An excessively thick patina can cause performance degradation due to the resulting higher voltage drop between the brush and commutator surface. When the patina is too thin, the wear rate of the brushes is increased.

In a conventional design, mechanically commutated DC motors employ only one type of commutator brush, either all single layer brushes or all multi-layer brushes. As a general rule, in such machines having all one type of brush, the positive brushes will wear more rapidly than the negative brushes due to the directional flow of electrical current and its impact on brush wear. During operation, positive brushes are also susceptible to sparking between their trailing edge and the opposing commutator contact as the brush is rotating beyond that contact and breaking the electrical connection between the brush and the contact.

The embodiments disclosed herein which utilize single layer brushes for the negative brushes and multi-layer brushes for the positive brushes reduce this discrepancy in wear between the negative and positive brushes while also providing additional benefits.

Copper is a softer and more conductive material than graphite/carbon, thus, as a general rule, brushes having a higher copper content will have a reduced electrical resistance for improved performance compared to lower copper content brushes but will experience greater wear than lower copper content brushes. One reason for the increased wear of higher copper content brushes is that a lower copper content and a higher carbon content will provide a harder brush that is more resistive to mechanical wear.

By using single layer brushes for the negative brushes and multi-layer brushes for the positive brushes, the embodiments disclosed herein take advantage of the reduced electrical resistance that can be obtained with relatively high-copper single layer brushes 56 for those brushes that are subjected to less wear, i.e., the negative brushes, while using the less electrically conductive but more wear resistant multi-layer brushes 54 for the positive brushes which are subject to greater wear.

Furthermore, by placing the low-copper layer 64 at the trailing edge, this positions the least conductive portion of brush 54 at the trailing edge and thereby helps to prevent and/or minimize such sparking between the contacts and the trailing edge 68 of the positive brushes 54. Due to the directional flow of the electrical current, negative brushes 56 are much less susceptible to sparking than positive brushes.

The inventor of the present application, found that using all single layer brushes with starter motor 40 did not provide the desired durability due to excessive brush wear and that using all dual-layer brushes with starter motor 40 resulted in an excessive patina that exacerbated the loss of performance inherent in the use of lower copper content multi-layer brushes. However, by utilizing single layer brushes as the negative brushes and multi-layer brushes as the positive brushes, the performance of the starter motor was significantly improved relative to the all multi-layer brush design and the durability was improved relative to the all single layer brush design.

More specifically, the illustrated starter motor 40 has a lower total starter internal resistance due to the lower resistance of the single layer brushes 56 (compared to a similar starter having all dual layer brushes 54) and thereby provides improved starter performance. Single layer brushes 56 are less expensive than multi-layer brushes 54 and, thus, using single layer brushes 56 for half of the brushes is less expensive than using all multi-layer brushes. The use of single layer brushes for the negative brushes was also found to provide a more optimal patina thickness on the commutator surface compared to a design with all multi-layer brushes. The use of single layer brushes having a cleaning agent as one of the additives was also found to be helpful in maintaining a desired patina thickness. Maintaining a desirable patina thickness, provides for a more stable starter performance throughout the life of the starter.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
   at least one field coil;
   at least one armature coil rotatable relative to the field coil about a rotational axis;
   a commutator conductively coupled with the at least one armature coil, the commutator having a plurality of contacts wherein the commutator and the plurality of contacts rotate about the rotational axis with the armature coil;
   a plurality of brushes conductively engageable with the plurality of contacts wherein rotation of commutator about the rotational axis causes the plurality of contacts to sequentially engage the plurality of brushes as the plurality of contacts rotate about the rotational axis with the commutator;
   wherein the plurality of brushes includes at least one positive brush and at least one negative brush, the at least one positive brush being a multi-layer brush and the negative brush being a single layer block brush;
   wherein the multi-layer brush includes a high-copper layer and a low-copper layer wherein both the high-copper layer and the low-copper layer comprise both carbon and copper with the high-copper layer having a greater content (by weight percentage) of copper than the low-copper layer and the low-copper layer has a greater content (by weight percentage) of carbon;
   wherein the high-copper layer has a greater circumferentially extending length than the low-copper layer with the high-copper layer forming the leading edge and the low-copper layer forming the trailing edge of each of the positive brushes;
   wherein each of the multi-layer brushes have only two layers; and
   wherein each of the single layer block brushes comprises carbon and copper and wherein the difference in carbon content (by weight percentage) between the single layer brush and the high-copper layer is less than the difference in carbon content (by weight percentage) between the single layer brush and the low-copper layer and wherein the difference in copper content (by weight percentage) between the single layer brush and the high-copper layer is less than the difference in copper content (by weight percentage) between the single layer brush and the low-copper layer.

2. The electric machine of claim 1 wherein the plurality of brushes includes at least four brushes wherein the plurality of brushes includes an equal number of positive and negative brushes with each of the positive brushes being a multi-layer brush and each of the negative brushes being a single layer block brush.

3. The electric machine of claim 1 wherein the single layer brush has a copper content (by weight percentage) that is greater than the copper content (by weight percentage) of the high-copper layer and wherein the carbon content (by weight percentage) of the single layer brush is less than the carbon content (by weight percentage) of the high-copper layer.

4. The electric machine of claim 3 wherein the plurality of brushes includes at least four brushes wherein the plurality of brushes includes an equal number of positive and negative brushes with each of the positive brushes being a multi-layer brush and each of the negative brushes being a single layer block brush.

5. The electric machine of claim 4 wherein the electric machine is a DC motor.

6. An electric machine comprising:
   at least one field coil;
   at least one armature coil rotatable relative to the field coil about a rotational axis;
   a commutator conductively coupled with the at least one armature coil, the commutator having a plurality of contacts wherein the commutator and the plurality of contacts rotate about the rotational axis with the armature coil;
   a plurality of brushes conductively engageable with the plurality of contacts wherein rotation of commutator about the rotational axis causes the plurality of contacts to sequentially engage the plurality of brushes as the plurality of contacts rotate about the rotational axis with the commutator;

wherein the plurality of brushes includes at least one positive brush and at least one negative brush, the at least one positive brush being a multi-layer brush and the negative brush being a single layer block brush;

wherein the electric machine is a DC motor, the plurality of contacts are copper contacts, the positive brushes have a circumferentially extending length that is the same as a circumferentially extending length of the negative brushes, and the plurality of brushes includes at least four brushes with an equal number of positive and negative brushes, each of the positive brushes being a multi-layer brush and each of the negative brushes being a single layer block brush; and wherein each of the multi-layer brushes has only two layers, a high-copper layer and a low-copper layer, wherein both the high-copper layer and the low-copper layer comprise both carbon and copper with the high-copper layer having a greater content (by weight percentage) of copper than the low-copper layer and the low-copper layer having a greater content (by weight percentage) of carbon; and wherein the high-copper layer has a greater circumferentially extending length than the low-copper layer and the high-copper layer forms the leading edge and the low-copper layer forms the trailing edge of each of the positive brushes; and wherein each of the single layer block brushes comprises carbon and copper and wherein the difference in carbon content (by weight percentage) between the single layer brush and the high-copper layer is less than the difference in carbon content (by weight percentage) between the single layer brush and the low-copper layer and wherein the difference in copper content (by weight percentage) between the single layer brush and the high-copper layer is less than the difference in copper content (by weight percentage) between the single layer brush and the low-copper layer.

7. The electric machine of claim 6 wherein the electric machine has exactly two negative brushes and two positive brushes.

8. The electric machine of claim 7 wherein the single layer brush has a copper content (by weight percentage) that is greater than the copper content (by weight percentage) of the high-copper layer and wherein the carbon content (by weight percentage) of the single layer brush is less than the carbon content (by weight percentage) of the high-copper layer.

9. The electric machine of claim 8 wherein the electric machine is a starter motor for a vehicle.

* * * * *